United States Patent [19]

Saran

[11] 4,334,246
[45] Jun. 8, 1982

[54] DATA DECOMPRESSOR CIRCUIT

[75] Inventor: Amitabh Saran, Cypress, Calif.

[73] Assignee: Xerox Corporation, Stamford, Conn.

[21] Appl. No.: 150,505

[22] Filed: May 16, 1980

[51] Int. Cl.[3] .............................................. H04N 7/12
[52] U.S. Cl. .................................. 358/261; 358/135; 364/900
[58] Field of Search ........................ 358/133, 135, 261; 364/200 MS File, 900 MS File

[56]  References Cited
U.S. PATENT DOCUMENTS

| 3,134,091 | 5/1964 | Shugart | 364/900 |
| 3,988,601 | 10/1976 | Perry | 364/900 |
| 4,228,467 | 10/1980 | de Loye et al. | 358/261 |

*Primary Examiner*—Joseph A. Orsino, Jr.
*Attorney, Agent, or Firm*—Robert E. Cunha

[57] ABSTRACT

A circuit and method for decompressing video subsequent to its prior compression for transmission or storage. The circuit assumes that the original video generated by a raster input scanner was operated on by a two line one shot predictor, coded using run length encoding into code words of four, eight, or twelve bits and packed into sixteen bit data words. This described decompressor, then, unpacks the data by joining together the sixteen bit data words and then separately the individual code words, converts the code words into a number of all zero four bit nibbles and a terminating nibble containing one or more one bits which constitutes decoded data, inspects the actual video of the preceeding scan line and the previous video bits of the present line to produce depredictor bits and compares the decoded data and depredictor bits to produce the final actual video.

13 Claims, 6 Drawing Figures

DATA DECOMPRESSOR CIRCUIT

BACKGROUND OF THE INVENTION

A circuit and method for decompressing image data that has been previously compressed for transmission or storage, and for the high speed loading of a band buffer in a bit map printing system.

In the usual high resolution scan system which transforms an original image, a photograph or the like, into a digital bit stream, usually through the use of a raster input scanner and thresholding circuit, there is a need to compress the resulting data. The reason may be to store the data in a minimum amount of memory, or to transmit the data in a minimum amount of time or to use a minimum bandwidth. One method of data compression is to encode the data into a run length code, a Huffman code, or any other well known compression code. In addition, a predictor may be used before the encoder. A predictor results in fewer one bits, longer runs of zeros, and a more efficient encoding. Later, when the compressed data is read out from memory, or when it is received as a transmission, it must be decoded and depredicted to reconsitute the original video.

In the transmission of an image, in a facsimile system or the like the compressing algorithm will occasionally result in an actual expansion of the data. This will usually occur in an image that has a great amount of detail, resulting in short run lengths. For example, in the disclosed embodiment, an eight bit code word may be required to encode four bits of data. An improvement in an encoding-decoding system is to inspect a compressed line, and to transmit raw video if the compression algorithm resulted in an expansion of the data. The associated decompressor must be able, on the receipt of the appropriate flag bits to couple the raw video to its output without going through the decoding and depredication process.

A third function of a decompressor is to be able to fill a band buffer which, in this system, is defined as a memory for storing the video required for sixty-four scan lines, at high speed to enable a bit map capability. A system having a bit map capability may be defined as having in memory a matrix of video bits equal to the number of pixels capable of being printed. Then, the completed bit map may be simply shifted out to the raster output scanner as a series of black or white signals in synchronization with the raster. The memory requirement is reduced by producing the bit map one band at a time. In the described embodiment, two band buffers, each with a capacity of sixty-four scan lines, are used. One is loaded from the decompressor while the other drives the printer.

In this disclosed system, the entire display, comprising image and text, resides in memory in condensed form. The image data is compressed and the text is character coded. Additionally, each element (image or character) contains size and location pointers in memory.

Using this system, a band is filled prior to being output to the printer by first writing the image information into it, segment by segment. The video is retrieved from memory, decompressed, located in the band, and loaded. For characters, a character generator is used which contains a font set for each size and style of font required. The character code is used to index the appropriate font set and to access the particular font raster, in compressed form, and this raster is then decompressed to produce the font video.

Some characters and most images will overlap several bands. In this case, intermediate information is stored away in memory for use during the next band loading cycle.

If a hard copy printing engine is to be driven, as is assumed for the remainder of this discussion, the bandwidth requirement is severe since an office-quality copy at modern copier/duplicator speeds can be produced only at a high bit rate.

Because of the factors stated above, a data decompressor in a system for printing mixed image and text must be capable of depredicting and decoding compressed video, and of loading a band buffer at high speeds.

SUMMARY OF THE INVENTION

The first step in the disclosed decompression process is the unpacking of the compressed data. In this embodiment, the code words are either four, eight or twelve bits in length, and are packed in memory into sixteen bit words. To separate the code words, data from memory is used to fill a two level sixteen bit "pipeline," from which the code words are latched out in their four, eight or twelve bit form. The first two bits of the code words indicate the code word size, and are coupled to a sequencer which controls the circuit to latch out the code words in the appropriate form and order. As the top level of the pipeline becomes empty, the sequencer also instructs the memory to supply the next sixteen bit data word.

These code words usually comprise a run length portion signifying the number of all-zero four bit nibbles followed by a portion signifying the bit pattern of the terminating nibble, defined as a nibble with one or more one bits.

In the decoder, the run length portion is used to set a counter which is then counted down as all-zero nibbles are output, and the terminating portion is converted in a ROM to its associated video pattern and latched out.

The decoded data must now be processed by a depredictor which reverses the results of the original predictor. The original predictor is based on the statistical fact that if the video bits in the previous line, and the preceeding bits in the current line, are known, the current bit can be predicted with a good probability of success. Of course, the process and circuitry can be simplified if a smaller number of bits in the previous and current lines are used, and in fact, a statistical analysis of the image and system characters will reveal the optimum pattern. The result is a "one-shot two line" predictor. This bit pattern is then moved along the scan lines to predict a series of current nibbles, which are then compared to the actual video to produce a resultant bit string which is more compressable.

The depredictor in the decompressor reverses this process. Several shift registers hold the previous line of actual video and the actual video already reconstituted in the current line, and drive the address inputs of a set of ROMs which produce the depredictor bits. These bits are then compared to the output of the decoder to form the actual video. To increase the circuit speed, four bits of video are processed during each clock period. Since each bit can be processed only after the previous bit has been determined, in order to produce four video bits every clock period, a two stage pipeline is used. In the first stage, during a first clock period, all but two of the pattern bits are used to produce a set of four or eight possible outputs for each of the four current bits. Then, in the second stage, during the second clock period, an XOR gate and multiplexer controlled by the remaining pattern bits, and the associated decoded bit from the decoder selects from the set of possible outputs the correct output video bit for that bit position. Since the determination of each current bit requires the previous bit as an input, the second stage is implemented from high speed components so that the logical signals will ripple through the set of four circuits during one clock period.

This video is output to the band buffer, but is also stored in the local RAM to be used as the previous line data when depredicting the next line.

If the system is operating with raw video for one scan line only, the video is stored in the RAM for the next line deprediction cycle and also output to the band buffer. If a block of raw video is being processed, the last line need not be saved and the video is sent out directly.

This system thus satisfies the stated performance requirement in that the system will receive data corresponding to fonts and images, decompresses the data if necessary, and loads it into a band buffer. High speed is achieved by using pipelines, and by processing data four bits at a time.

DETAILED DESCRIPTION OF THE INVENTION

Figure 1:
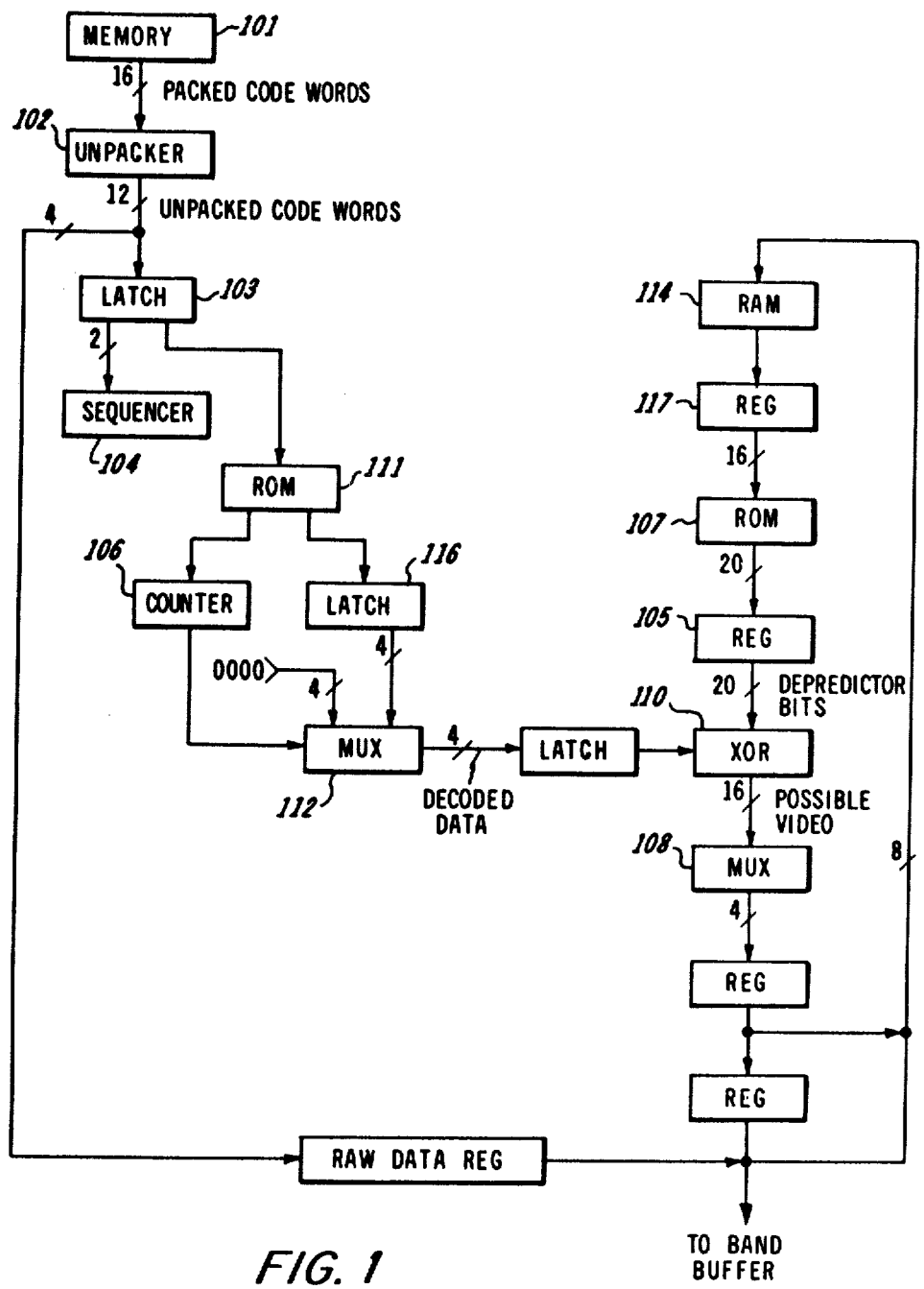
FIG. 1 is an overall block diagram of the decompressor.

FIG. 1 is an overall block diagram of the decompressor. Compressed data in the form of four, eight, and twelve bit words is packed into a sixteen bit memory 101. On sequencer 104 command these sixteen bit words are input to the unpacker 102 which separates the data into four, eight or twelve bit code words. The unpacker 102 comprises a two level sixteen bit pipeline from which code words are extracted. The output words are latched out through latch 103 to the decoder ROM 111. Also, the two most significant bits, which indicate the length of the code words, are coupled to the sequencer 104. This sequencer 104 tracks the movement of the data in the unpacker 102 pipeline and requests a new word from memory 101 when space in the unpacker 102 pipeline becomes available.

The counter 106 is set by ROM 111 to the count of the number of four bit all-zero nibbles in the current run length and will control the multiplexer 112 to output an all-zero nibble on each clock pulse as it is counting down. At the same time, latch 116 is loaded with a decode of the nibble of video that terminated the run. At a count of zero, the terminating nibble in latch 116 is selected by multiplexer 112. The resulant multiplexer 112 output is now decoded, and is ready for deprediction.

The next function to be performed is the production of video bits at the multiplexer 108 based on a comparison of the depredictor bits from ROM 107, and the decoded bits from multiplexer 112. As explained above, this comparison takes place in two stages, and produces four output video bits per clock period.

The first stage uses nine video bits for each current bit from register 117 to address the ROM 107 to produce four sets of four possible depredictor bits. These are stored in register 105.

The second stage compares all depredictor bits with their corresponding decoded data bits to produce four possible video bits for each current bit. Then a multiplexer controlled by the last two (previously unused) pattern bits selects the four video bits for output to the RAM 114 and band buffer. In fact, the last pattern bit for each current bit is not available at the beginning of this second clock period, but becomes available during the clock period. Therefore, this multiplexer circuit 108 is implemented from high speed devices to allow the signals to ripple through in one clock period.

A discussion of the circuit details follows. The first function is the unpacking of the code words and is accomplished in the circuit of FIG. 2. Sixteen bit data words are recieved from memory which contain code words four, eight or twelve bits in length. These code words start on any four bit nibble boundary, so that the eight and twelve bit code words frequently overlap the sixteen bit data word boundaries. By putting the data words together into an unlimited string of four bit nibbles, and then separating the string into discrete four, eight or twelve bit code words, the output of the original encoder can be recreated.

Figure 2:
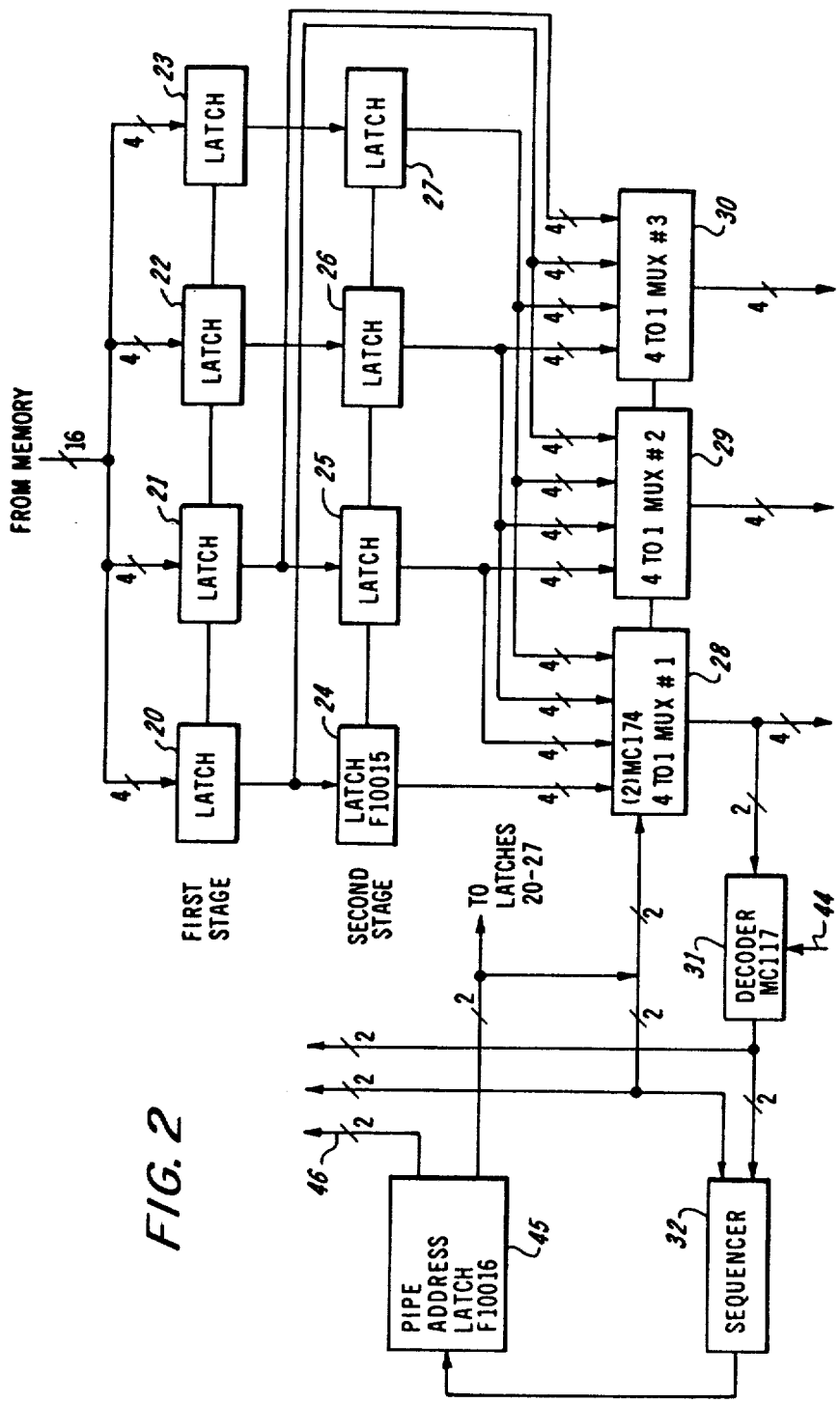
FIG. 2 is a block diagram of the unpacker.

When, through the operation of the remainder of the circuit in FIG. 2, the first stage latches 20,21,22,23 become empty, the next sixteen bit data word will be loaded from memory. Likewise, when the second stage latches 24,25,26,27 become empty, the first stage word is shifted, in parallel, into the second stage, and a new word is transferred from memory into the first stage. Finally, twelve bit multiplexer 28,29,30, implemented from three four-bit multiplexer devices, and under sequencer 32 control, will select from the latches the next four, eight or twelve bit code word.

To explain the operation of this circuit by way of example, assume that the first four bits of the first code word are in latch 24. Then, if it is a four bit code, the contents of latch 24 will be multiplexed out through multiplexer 28 as the first code word output. Similarly, eight or twelve bit words in latches 24,25 or 24, 25,26, would be multiplexed out through multiplexers 28,29, or 28,29,30, respectively.

In the worst case, the first twelve bit code word would be latched out from latches 24,25,26. On the next clock pulse, the next twelve bit code word would be multiplexed out from latches 27, 20, and 21.

Whenever the second stage becomes empty, the first stage word is shifted down into the second stage, and a new data word shifted into the first stage. Thus, two stages, each sixteen bits wide, must be provided.

The first two bits of the code word, always available at the output of multiplexer 28, specify the number of bits in the code word. These bits are decoded in decoder 31, and are then input to the sequencer 32 which computes the location of the next code word in latches 20 through 27, controls the multiplexer 28,29 30 to output it, and controls the latches 20 through 27 to shift a data word from the first to the second stage if necessary. In fact, the data from latches 24,25 and 26 is always loaded into multiplexers 28, 29 and 30, but the decoder 31, in response to the two leading bits of the multiplexer 28 output word, will prevent the irrevelant data from being latched out from multiplexer 29 and 30 whenever appropriate.

Figure 3:
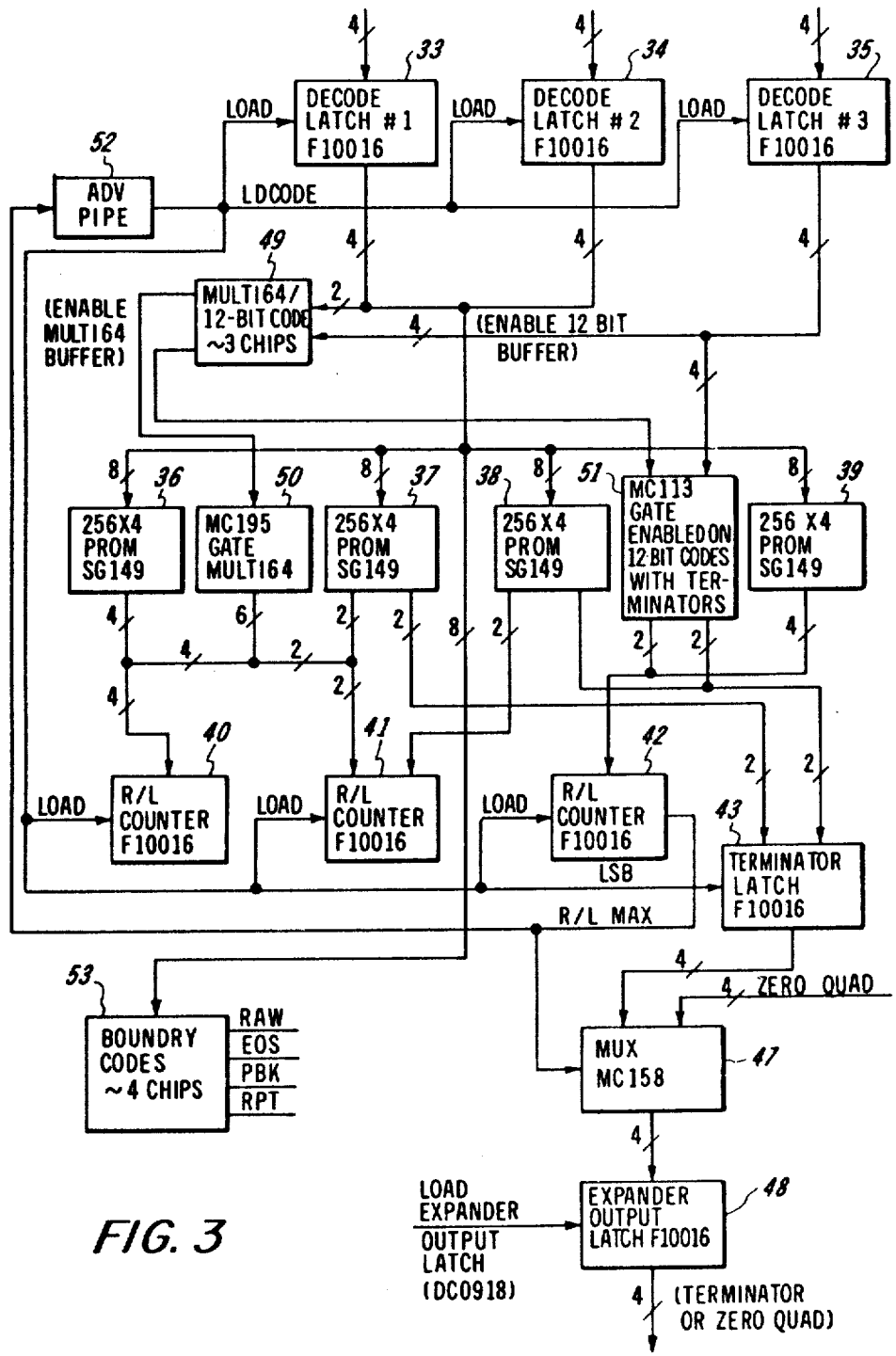
FIG. 3 is a block diagram of the decoder.

The output of the FIG. 2 multiplexer 28,29 and 30 is coupled to the decode latches 33,34,35 of FIG. 3, the outputs of which are used to address PROMs 36 through 39 which decode the code words into their associated run lengths and terminating nibbles. The run length portion of PROM 36, 37, 38, 39 output is used to set the twelve bit run length counter 40,41,42 and the four bit terminating portion is temporarily stored in the terminator latch 43. Gate 50 ensures that the six most significant bits of the counter 40 and 41 are forced to zero, because the run lengths are less than 64.

An alternative to the reception of compressed data is that the data words being received from memory are raw video. In this case, nibbles are shifted one at a time through the system. The decoder 31 of FIG. 2 is locked up by an input on the raw data control signal input line 44 into a mode where a constant output to the sequencer 32 results in a simple cycling of the latch 24, 25,26,27 outputs through multiplexer 28. Therfore, in this raw data mode, the two bits usually coupled from the multiplexer 28 to the decoder 31 are ignored.

In all cases, the "pipeline" comprising latches 20 through 27 is controlled by a pipeline address latch 45 which receives the next "address" from the sequencer 32 controls the multiplexers 28, 29, 30 to select the correct latch output from up to three of the six latches 20, 21, 24, 25, 26 and 27. The sequencer 32 will "promote" a data word from the first to the second stage when the initial nibble is in the second stage before the promotion, and will simultaneously send a data request through the data request line 46 to the memory.

The decoded data in the form of a count in the counter 40, 41, 42, of FIG. 3 and the terminating nibble in the latch 43 must be output to the depredictor. First, on every clock pulse, an all zero four bit nibble is shifted out through multiplexer 47 and output latch 48, and the counter 40, 41, 42 is decremented. When the counter 40, 41, 42 reaches zero, the terminating nibble is shifted out through latch 43, multiplexer 47 and latch 48.

As described above, if the number of all-zero nibbles exceeds sixty-four, a second twelve bit code word is required. In this case, the decoder 49 of the twelve bit multiplexer code is used to disable gate 50 which allows the PROM 36 and 37 outputs to be loaded in the most significant six bits of the counter 40 and 41. Gate 51 also couples the terminator nibble from latch 35 to terminator latch 43 when the last four bits of the code word comprise an actual four bit video nibble.

When the counter 40,41, 42 counts through to zero, a signal is sent from counter 42 through gate 52 to the latches 33, 34, 35 so that on the next clock, at the time that the previous terminator is latched into output latch 48, a new run length and terminating nibble will be loaded from latches 33, 34, 35 into counter 40, 41, 42 and terminator latch 43.

At all times the eight bits from latches 33, 34 will be coupled to decoder 53, but only when that eight bit code word is a control code, one of four outputs will be generated to alert the remainder of the system that a code word signifying raw video, a prediction break, a repeated line, or an end of scan has been received.

Figure 4:
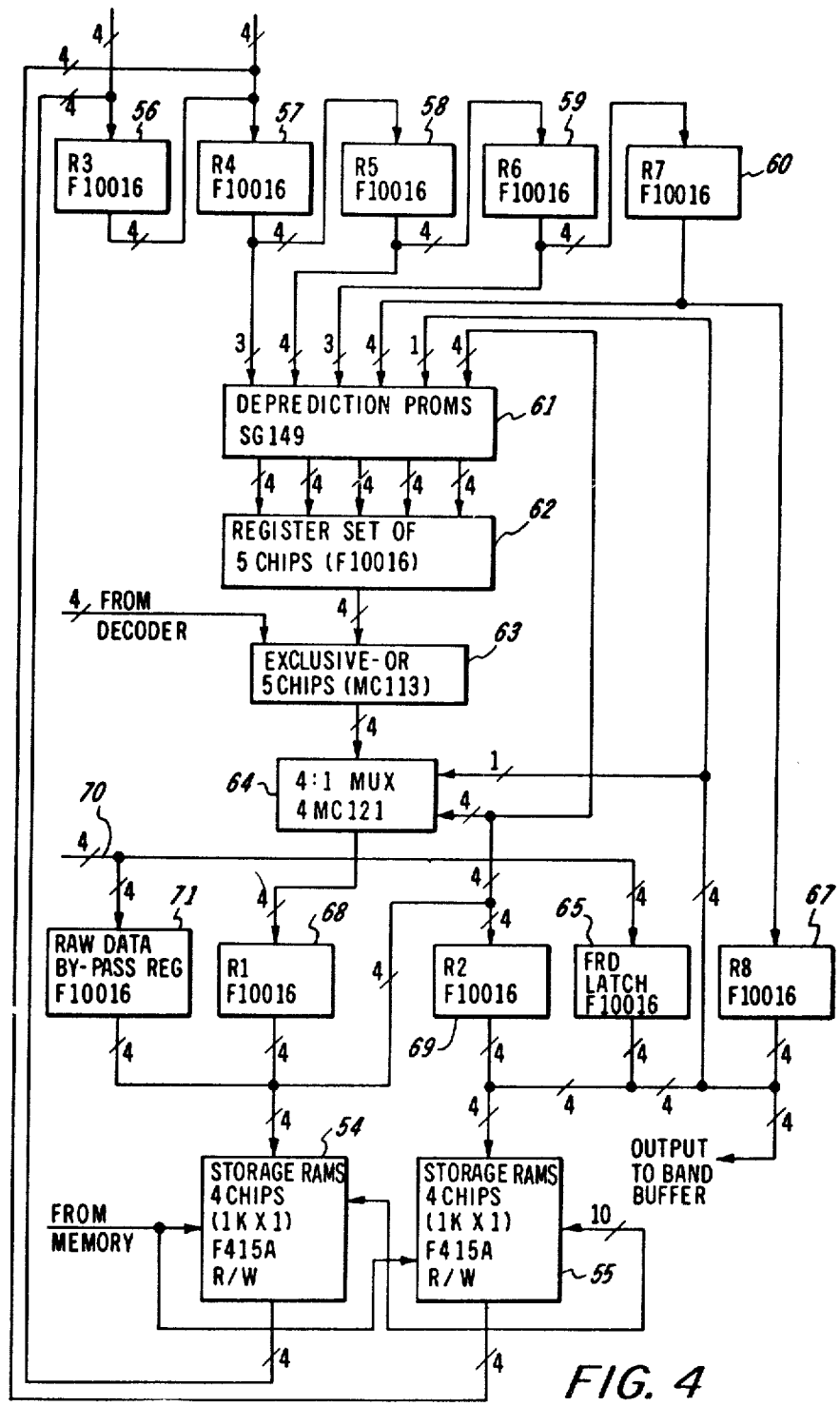
FIG. 4 is a block diagram of the depredictor.
Figures 5, 6:
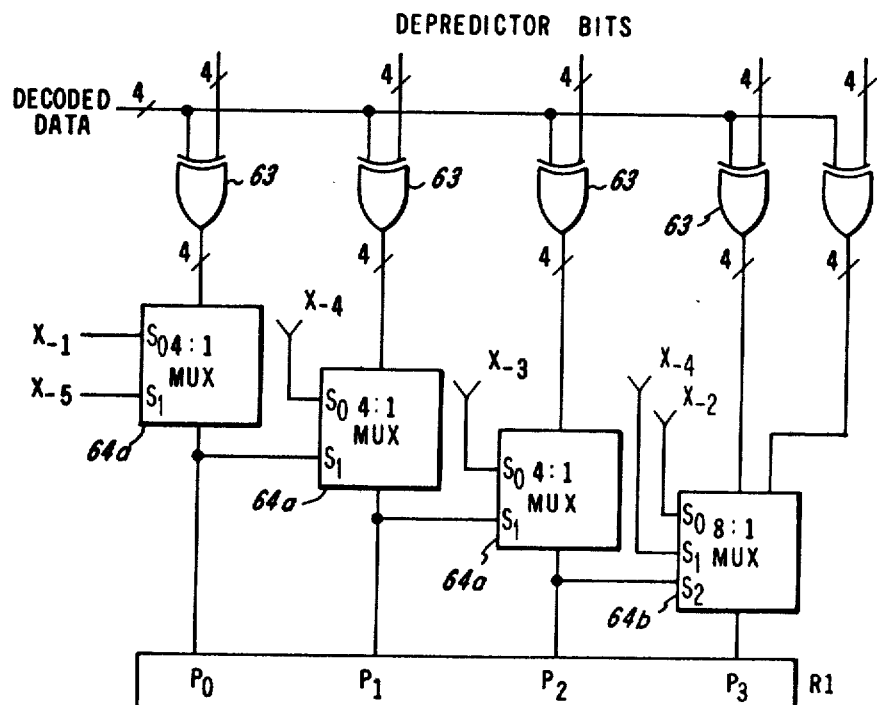
FIG. 5 is an illustration of the two line predictor pattern.
FIG. 6 is a simplified schematic of the multiplexer and XOR gate of the predictor.

The predictor circuit is shown in FIG. 4. As explained above, the original predictor inspects selected bits in the current line and the previous line during the prediction process. The exact pattern used in the predictor of the described embodiment is shown in FIG. 5, where the instant bit P0 is predicted after an inspection of the eleven video bits of the current and previous line marked "X."

The deprediction process, which will be described below, results in the creation of video data line by line, the previous line of which is available in the RAMs 54, 55. This previous line of video is taken from the RAM 54, 55 eight bits at a time, and used in the deprediction process. Several clocks later, the newly reconstituted video of the current line is loaded into the same locations. Thus, the last line is always available in the RAM 54,54.

The data from this circuit output is also sent to band buffers in each of which is loaded video for sixty-four scan lines. One buffer will be driving the raster output scanner or equivalent while the other is being loaded from the output line of FIG. 4.

Each band buffer is loaded a segment at a time where a segment is defined as that area of the buffer corresponding to one letter font or one image. Then, the most efficient method of loading the buffer is, in the case of a character, to generate the font, line by line, in a character generator which produces the font in compressed form; decompress the font in the circuit of FIGS. 2,3 and 4; and output it to the band buffer. Images stored in compressed form are handled in an identical decompression process.

Sixty-four scan lines per buffer are provided as a compromise. In a smaller buffer there would be a decreased likelihood that an entire character font would be stored in a single buffer, increasing the likelihood of a character overlap between buffers. When this happens, the system hardware and software has to handle the overhead involved in locating the character in the buffer several times and storing the last video line (for deprediction) between buffer fills. In the other direction, larger buffers simply require more memory. Images almost always overlap the buffers because of their larger size in any case.

The RAMs 54,55 contain 8K bits, and can be controlled to maintain the last line of any segment or segments up to this capacity between buffer fills. The last line data for several overlapping characters, may therefore, be saved between buffer fills, reducing overhead.

As shown in FIG. 5, the original prediction process uses the video bits of the previous line and the current line marked X to predict the current bit P0. If the prediction fails, the predictor outputs a one, and if the prediction is successful, the output is a zero. Similarly, in the depredictor, first the P0 bit is determined using the actual video, already depredicted, in the previous and instant lines, and the pattern of FIG. 5. Then the corresponding bit output from the decoder is compared to it. If P0 and the corresponding decoder output bit are equal, the video bit should be a zero, and if different, should be a one. In this way, the original video is reconstituted.

The actual deprediction process is slightly different than that described above because bits are processed at a rate of four bits per clock to increase the speed.

First, if the image segment is an overlap from the previous band the last line of video either must have been saved in the RAM 54, 55 from the last band buffer loading, or must be loaded in from memory.

The last line of pattern data is loaded from RAMs 54, 55 into register 56, 57, eight bits in parallel, on every other clock. On every clock, shift register 56-60 data is shifted right four bits. The bits are available to address ROM 61. In addition five bits of current line video are coupled to ROM 61, four bits from register 68 and one bit from register 69. Thus, all bits in the pattern for the deprediction of the three P bits, P0-P2, of FIG. 5 are available except two which will be processed at the second stage. For $P_3$, three bits are not available. Specifically, the video bits not available at ROM 61 are X-5 and X-1 for P0, X-4 and P0 for $P_1$, X-3 and $P_1$ and $P_2$ and X-4, X-2, and $P_2$ for $P_3$.

The available pattern bits at the address lines of ROM 61 enable the ROM 61 to output five sets of four possible depredictor bits to register 62 during the first clock period. In effect, the ROM 61 and register 62 are the first stage of a two stage pipeline.

The second stage comprises a set of possible exclusive OR gates 63, multiplexers 64, and register 68, drawn in more detail in FIG. 6. The five sets of of possible depredictor bits are XORed against the four bits of decoded data to produce five sets of four possible video bits. Then the 4:1 multiplexers 64a, controlled by the appropriate pattern video bits select the one of four. $P_3$ is selected by use of an eight to one multiplexer 64b. The circuit ripples through, to produce four bits of video which, in FIG. 4 are then available for loading into registers 68 and 69 for subsequent loading in RAM 54, 55 to complete the cycle.

The output to the band buffer is normally taken from register 69. If the band buffer (64 scan lines) limit is reached and there is still more of an image segment to be processed, the last line of video is saved in the RAM 54,55 as usual and in addition is sent to the memory for storage. Having thus written one segment, a character font or an image, into the band buffer, the process will be repeated for the next segment. When the band buffer is completely filled, it is used to drive the output printer, and the circuit begins to load the other band buffer.

The registers 56 through 60 contain the previous line of video for the prediction process and receive data either from memory on the first line of a band, or from the RAMs 54, 55 within a band. The source of RAM 54, 55 data is registers 68, 69. The circuit is implemented so that on every clock, register 68 data is shifted into register 69, on every other clock eight bits of data are read from the RAMs 54, 55 to register 56, 57 and on the remaining clocks, data is written from registers 68, 69 to the RAMs 54, 55. As previously stated, the write pointer is a few addresses behind the read pointer so no data is lost.

In some cases, a greater compression than that obtained by the described coding process is required at the expense of image quality. One way to achieve a doubling of the compression is, simply, to delete every other line at the coder and repeat every line at the decoder. In this mode, each line, as it is produced, will be shifted out from register 69 to the band buffer, and will also be stored in RAM 54, 55. Next, the repeat line is shifted from RAM 54, 55 through registers 56, 57, 58, 59, 60, and register 67 to the band buffer.

In another mode, one line of uncompressed video may be transmitted through the system. This would occur if the compression algorithm results in an expansion of data, in which case, a transmission of the line raw data would be more efficient. Raw video is received from the multiplexer 28 of FIG. 2 on line 70 of FIG. 4 and is coupled through register 71 and register 69, to RAM 54, 55, and to the output. Using this process, this line of video is now available to the depredictor in RAM 54, 55 for the deprediction of the next line.

In the case where there are a plurality of lines of raw video, the path is from line 70 through register 65 to the output. The previous line need not be saved.

The invention is not limited to any of the embodiments described above, but all changes and modifications thereof not constituting departures from the spirit and scope of the invention are intended to be covered by the following claims.

What is claimed is:

1. A data decompressor for decoding and depredicting a series of scan lines of compressed video data into actual video, said data comprising variable length code words packed into fixed length compressed video data words, said code words comprising a run length portion or a terminating portion, said decompressor comprising:
    an unpacker for putting together into an unlimited string a series of fixed length data words, and for separating said string into variable length code words,
    a decoder for translating each of said run length portions of said code words into an output comprising a series of zeros and for translating each of said terminating portions into an output comprising a decoded video pattern for ones and zeros,
    a depredictor for inspecting selected bits of the actual video in the previous scan line and in the previous bits of the current scan line, and therefrom, producing an output comprising the next set of predicted video bits, and
    a comparator for comparing the output of said depredictor and the output of said decoder, producing therefrom actual video and for providing said depredictor with said actual video for use in the deprediction of the following sets of predicted video bits.

2. The decompressor of claim 1 wherein said code words are four, eight, or twelve bits in length, and said fixed length data words are sixteen bits in length.

3. The decompressor of claim 2 further comprising a memory for receiving the actual video output of said comparator for temporarily storing said actual video and for coupling said actual video to said depredictor.

4. The decompressor of claim 3 werein said unpacker comprises a sixteen bit register pipeline for temporarily holding a plurality of data words while said unpacker selects therefrom the next code word for coupling to said decoder.

5. The decompressor of claim 4 wherein said decoder comprises a counter which is loaded with the run length portion of said code word, and means to output to said comparator four zero bits for each count.

6. The decompressor of claim 5 wherein said decoder comprises a ROM which is addressed by said code word to produce a count representing the number of all zero nibbles to be loaded into said counter and said pattern of ones and zeros which constitute the decoded video terminating nibble.

7. The decompressor of claim 5 wherein said decoder comprises a ROM which is addressed by selected bits of the previous line of actual video and selected previous bits of the current line of actual video to produce four bits of depredicted video which will be compared in said comparator against said decoder output to produce actual video therefrom.

8. The decompressor of claim 7 wherein said decoder further comprises a boundary code decoder for generating a specific control line output for each associated control code received as a decoder input.

9. The decompressor of claim 8 wherein the first two bits of said code words indicate the code word length, and wherein said unpacker comprises means responsive to said two leading bits to control said unpacker to output from said pipeline the correct number of bits as the instant code word output, and to move data along said pipeline when necessary.

10. The method of decompressing a series of scan lines of compressed video data comprising code words of four, eight, or twelve bits packed in fixed length data words into actual video comprising the steps of;
   putting together said fixed length data words into an unlimited string of nibbles,
   separating said string of nibbles into said code words, each comprising a run length portion or a terminating portion.
   converting said run length portion into a series of all zero nibbles and said terminating portion into a decoded video nibble having one or more one bits,
   predicting the current four bits of video from selected bits of the previous line of actual video and from selected previous bits of the current line of actual video,
   comparing the results of the converting step and the predicting step to produce four bits of actual video.

11. The method of claim 10 further comprising the step of storing and subsequently outputting each scan line of actual video to enable the repeating of every scan line.

12. The method of claim 10 further comprising the steps of inspecting each code word prior to said converting step and to decode said code word into a control line output if said code word is a control word.

13. The method of claim 12 further comprising the step of storing the actual video produced in said comparing step for future use in said predicting step.

* * * * *

UNITED STATES PATENT AND TRADEMARK OFFICE
CERTIFICATE OF CORRECTION

PATENT NO. : 4,334,246

DATED : June 8, 1982

INVENTOR(S) : Amitabh Saran

It is certified that error appears in the above-identified patent and that said Letters Patent is hereby corrected as shown below:

On the title page, Item [75] should read:

--- [75] Inventors: Ronald E. Rider, Palos Verdes Estates; Carl Friedman, Redondo Beach; Stephen Dashiell, Pasadena and Amitabh Saran, Cypress, all of California. ---

Signed and Sealed this

Twenty-sixth Day of July 1983.

[SEAL]

Attest:

Attesting Officer

GERALD J. MOSSINGHOFF

Commissioner of Patents and Trademarks